US008630771B2

(12) United States Patent
Sternecker et al.

(10) Patent No.: US 8,630,771 B2
(45) Date of Patent: Jan. 14, 2014

(54) CONTROL METHOD FOR ELECTRIC POWER STEERING (75) Inventors: Bernd Sternecker, Haar (DE); Caroline Dannoehl, Vaterstetten (DE); Roland Lohninger, Munich (DE); Imre Szepessy, Budapest (HU); Adam Varga, Budapest (HU)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/499,593

(22) PCT Filed: Sep. 24, 2010

(86) PCT No.: PCT/EP2010/005847
§ 371 (c)(1),
(2), (4) Date: Mar. 30, 2012

(87) PCT Pub. No.: WO2011/038865
PCT Pub. Date: Apr. 7, 2011

(65) Prior Publication Data
US 2012/0191302 A1    Jul. 26, 2012

(30) Foreign Application Priority Data
Oct. 2, 2009   (DE) .......................... 10 2009 048 091

(51) Int. Cl.
*B62D 5/04*   (2006.01)
*B62D 6/08*   (2006.01)
(52) U.S. Cl.
USPC ............... 701/41; 180/6.2; 180/6.28; 180/78; 180/315; 180/443; 180/446; 123/395
(58) Field of Classification Search
None
See application file for complete search history.

(56) References Cited

U.S. PATENT DOCUMENTS 5,365,904 A * 11/1994 Nofsinger et al. ............ 123/359
5,842,143 A * 11/1998 Lohrenz et al. .............. 701/30.3
(Continued)

FOREIGN PATENT DOCUMENTS

DE    198 21 220 A1   5/1999
DE    100 35 356 A1   7/2001
DE    101 10 741 A1   8/2001
DE    100 63 605 B4   1/2006

OTHER PUBLICATIONS

International Preliminary Report on Patentability and Written Opinion of the International Searching Authority, International Application No. PCT/EP2010/005647, date of issuance Apr. 11, 2012 (English language copy).

(Continued)

*Primary Examiner* — Helal A Algahaim
*Assistant Examiner* — Rebecca Wagner
(74) *Attorney, Agent, or Firm* — Novak Druce Connolly Bove + Quigg LLP (57) ABSTRACT

The invention relates to a control method for a steering system with electric power assistance, comprising a steering wheel, an electric power assist motor, an electric control unit, which includes a memory for storing digital data, a motor driver unit which based on a target engine torque that is delivered to the motor driver unit, determines and sends out electrical signals for controlling the electric power assist motor, at least one sensor device for determining a control variable introduced into the steering wheel, for example a manual torque, wherein in the control unit with the help of the control variable a preset value is determined for a engine torque of the power assist motor, characterized in that in the memory an upper threshold value for the target engine torque is stored and for a case A, in which the preset value exceeds the upper threshold value, the control unit sends out the upper threshold value as the target engine torque to the motor driver unit and in a case B, in which the preset value does not exceed the upper threshold value, the control unit sends out the preset value as the target engine torque to the motor driver unit.

7 Claims, 6 Drawing Sheets

(56) References Cited

U.S. PATENT DOCUMENTS

| | | | |
|---|---|---|---|
| 6,029,767 A * | 2/2000 | Kifuku | 180/443 |
| 6,404,156 B1 * | 6/2002 | Okanoue et al. | 318/432 |
| 6,497,303 B1 * | 12/2002 | Nishimura et al. | 180/446 |
| 8,140,222 B2 * | 3/2012 | Watanabe et al. | 701/41 |
| 2001/0017229 A1 * | 8/2001 | Kada et al. | 180/446 |
| 2009/0099731 A1 * | 4/2009 | Watanabe et al. | 701/41 |

OTHER PUBLICATIONS

International Search Report and Written Opinion, International Application No. PCT/EP2010/005847, dated Nov. 12, 2010.

* cited by examiner

CONTROL METHOD FOR ELECTRIC POWER STEERING

CROSS-REFERENCE TO RELATED APPLICATIONS

This application is a National Stage of International Application No. PCT/EP2010/005847, filed Sep. 24, 2010, and claims priority of German Application No. 10 2009 048 091.9, filed Oct. 2, 2009. The disclosures of the prior applications are incorporated herein in their entirety by reference.

The present invention relates to a control method for a steering system with electric power assistance having the features of the preamble of claim 1.

Motor vehicle steering systems with electric power steering generally comprise a steering column which is connected via steering gear with the steered wheels of the vehicle. The steering column contains a torque sensor for the torque that the driver introduces into the steering. An electric servomotor is also provided, which drives the steering gear via a reduction gear and assists the driver in performing the steering. A control is necessary in order to ensure that the servomotor generates precisely the amount of power assistance necessary to achieve a certain steering characteristic. For example, at low speeds and high torques a high level of power assistance should be generated in order to take the burden off of the driver when parking and at higher speeds and lower torques a low level of power assistance should be generated in order that the driver experiences a direct steering feel. A very important aspect is that malfunctions of the sensor, the control system or the electric motor do not lead to the electric motor performing undesired and unexpected steering manoeuvres.

The general object of control systems therefore is to provide interference-free functioning of the electric power steering.

German patent specification DE 100 636 05 B4 provides that an electric motor is controlled via a driver. In addition a driver limiting device is provided in order to limit the driving of the electric motor. The driver limiting device switches off completely if a fault is detected in the motor driver. During vehicle operation this results in a total and sudden loss of the power assistance. This can have an irritating effect for the driver.

German published application DE 198 21 220 A1 provides that the motor current is limited by an upper threshold value. In this way excess power assistance can be prevented. This limit is determined on the basis of the back electromotive force. Thus it is not possible, however, to compensate for instabilities within the controller itself. Instabilities can be attributed to various causes. The driver for example may unnecessarily turn the steering wheel back and forth. The road surface may be uneven, introducing periodic disturbances into the control system. The steered wheels of the motor vehicle may have an imbalance, likewise generating periodic interferences. Such instabilities cannot be compensated by limiting the motor current. The publication does not provide for any lower limit of the motor current either, so that the steering assistance torque can tend to zero. In the case described this corresponds to a complete and sudden loss of the power assistance.

A similar solution is described in U.S. Pat. No. 6,404,156 B1. Here limitation of the power assistance is brought about by upper and lower threshold values for the motor current. In the chain of electronic control, comprising the various sensors (torque sensors, speed sensor), a booster with phase compensation, a motor driver and the servomotor itself, at the booster and phase compensation stage the sensor values are processed without any preset restriction and delivered to the driver. The driver limits the range of values of the control signal for driving the electric motor in order to prevent excessively high and low motor currents and thus excessively high or low steering assistance torques.

Steering systems according to the prior art described have the following restrictions on the driving dynamics:

The steering systems according to DE 100 636 05 B4 and DE 198 21 220 A1 limit the range of values for the possible motor current in certain driving situations. In this way the maximum possible motor output and thus the maximum power assistance are also limited. In extreme situations such as for example evasive manoeuvres or also extreme and unforeseeable influences on the steered wheels this can lead to a higher manual torque being exerted on the steering wheel than is actually necessary on the basis of the driving situation and the technically available output of the servomotor. In many situations, therefore, steering systems do not fully utilise the dynamic range of the servo unit.

According to a further exemplary embodiment of the steering equipment according to U.S. Pat. No. 6,404,156 B1 the sensor signal that is delivered by the torque sensor of the steering equipment to the control system is limited as a function of certain parameters. As a result of this, information on extreme values of the torque sensor, which for example can occur if the driver operates the steering wheel with a very high manual torque (evasive manoeuvre) or if extreme influences act upon the steering (potholes, hitting the kerb, sudden tyre defect), is lost. On the basis of the previously limited sensor signal the control system is unable to recognise such situations and therefore cannot respond appropriately to them. An appropriate response in the stated cases would be to increase the steering assistance torque to the technically possible maximum value, in order to keep the manual torque on the steering wheel within predefined limits. If the sensor signal is limited before it reaches the control system this is not possible. As a result neither does this steering equipment utilise the full dynamic range of the servo drive that is technically available.

The object of the present invention is therefore to provide a control method for electric power steering, which even in critical steering situations maintains stable driving and increases fault tolerance. In particular a control for electric power steering is provided which is able to fully utilise the available dynamic range of the servo drive.

This object is achieved by a control method with the features of claim 1. In claims 2 to 7 advantageous developments of the invention are presented.

In a control method for a steering system with electric power assistance, comprising:
- a steering wheel, controllable by a driver,
- an electric power assist motor,
- an electric control unit, which includes a memory for storing digital data,
- a motor driver unit (motor controller) that based on a target engine torque, sent to the motor driver unit, determines and delivers electrical signals for controlling the electric power assist motor,
- at least one sensor device for determining a control variable introduced into the steering wheel, for example a manual torque,
- wherein in the control unit with the help of the control variable a preset value for a engine torque of the electric power assist motor is determined,
- it is also provided that
- in a limiting element an upper threshold value for the target engine torque is stored, and for a case A, in which the preset value exceeds the upper threshold value, the limiting element delivers the upper threshold value as the target engine torque to the motor driver unit, and for a case B, in which the preset value does not exceed the upper threshold value, the limiting element delivers the preset value as the target engine torque to the motor driver unit.

This allows both the sensor signal to be evaluated across its full range of values and the motor driver unit to impinge upon the motor with its full available output current so that in extreme situations the maximum available dynamics of the steering system can be utilised. The limiting element is arranged in the signal path between the controller, which determines the preset value for the target engine torque, and the motor controller. The limiting element can however also be physically combined with the control system in a single unit. Here it is immaterial whether the limitation is achieved purely by software engineering or purely by hardware engineering or as a combination of software and hardware engineering.

If it is also provided that
in the memory a lower threshold value for the target engine torque is stored, the value of which is lower than the upper threshold value, and for a case C, in which the preset value falls below the lower threshold value, the limiting element delivers the lower threshold value as the target engine torque to the motor driver unit, and for a case D, in which the preset value does not fall below the lower threshold value and does not exceed the upper threshold value, the limiting element delivers the preset value as the target engine torque to the motor driver unit, it can also be prevented that the target engine torque because of incorrect information, for example from the sensors, causes the power assistance being lost suddenly and unexpectedly for the driver.

The limiting values for the maximum and minimum target engine torque can be designed to be variable and can thus be matched to the parameters of the driving situation, if the upper and/or the lower threshold value is dependent upon the control variable introduced.

At higher speeds the control approximates to a control system which undertakes no or only minor control interventions if at high vehicle speeds the distance between the upper threshold value and the lower threshold value is smaller than at low vehicle speeds.

A damping element and a stabilisation element can be provided which generate damping and stabilisation signals, wherein the sum from the output signals of the limiting element, the damping element and the stabilisation element is output as the target engine torque to the motor controller. As a result the control is stabilised in a particularly effective manner.

A safety function can be provided which carries out a redundant calculation of the output signal of the limiting element, the damping element and the stabilisation element. Such a safety function requires only slight processor power, which is then in particular the case if the safety function does not perform the calculation process of the controller completely redundantly. In the event of inconsistency of the calculated signals it can bring about the deactivation of the power assisted steering.

In the following an exemplary embodiment of the present invention is described in more detail using the drawing. This shows as follows.

Figure 1:
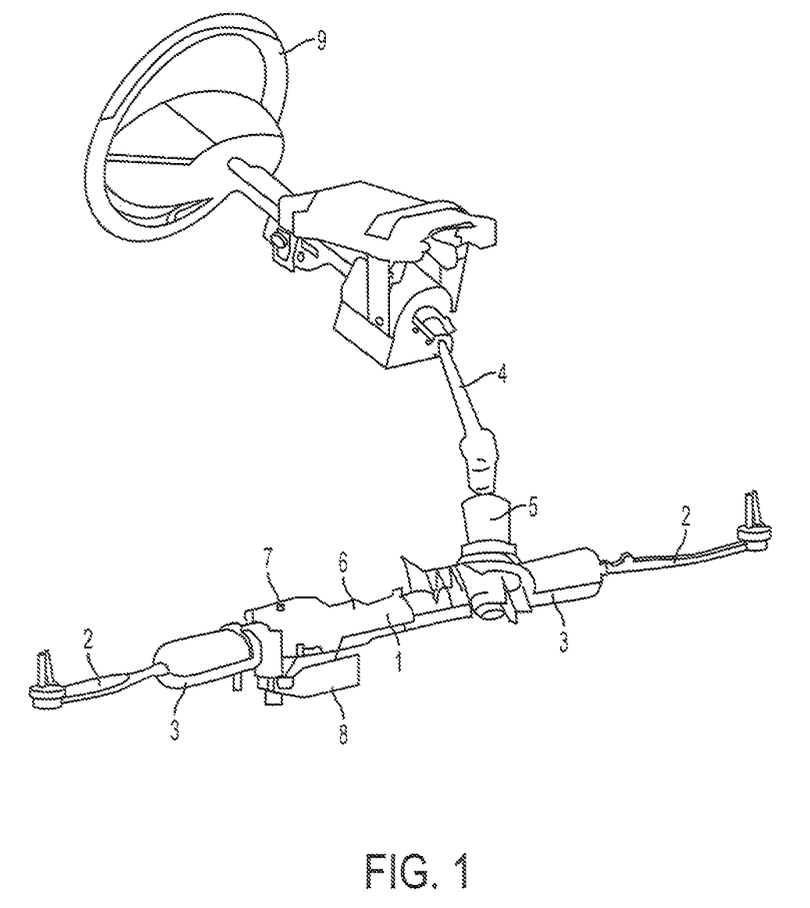
FIG. 1: an electric power-assisted steering system in a perspective view.

FIG. 1 shows a motor vehicle power steering system with a steering gear 1, in which a steering rack is arranged in the longitudinal direction of the steering gear 1 in a movable manner. The steering rack carries two track rods 2, which are connected by means of ball-and-socket joints with the steering rack. The ball-and-socket joints are arranged in bellows 3 encapsulated against environmental influences. The track rods 2 are for their part connected with steering knuckles of the steered wheels. A displacement of the steering rack in the steering gear 1 thus leads in a known manner to a pivoting of the steered wheels and thus to a steering manoeuvre of the motor vehicle.

By means of a steering shaft 4 a torque is introduced into the steering. A torque sensor 5 detects the torque introduced into the steering shaft 4. In order to provide power assistance for the steering process and thus to reduce the manual torque to be applied by the driver a servo drive is incorporated in the steering gear 1. The servo drive comprises a motor housing 6, a gear housing 7 and a control system 8. The motor and the gear cannot be seen in this representation.

During operation, in prior art fashion the driver operates a steering wheel 9 which then via the steering shaft 4 and a pinion brings about a displacement of the steering rack in the steering gear 1. The torque detected in the torque sensor 5 is monitored and in order to simplify the steering manoeuvre the servo motor is impinged upon through the control system 8 with current, in order to assist the steering movement of the driver.

Multiple possibilities exist for controlling and regulating the power assisted steering. Thus the control system 8 can in the simplest of manners provide power assistance via the servomotor, in that the required engine support torque is simply proportional to the sensor torque determined. In practice power assisted steering systems are in many cases controlled via operating maps which are stored in a memory in the form of a table of values or by the saving of analytical functions. A value range for the result of such a control is shown in FIG. 2.

Figure 2:
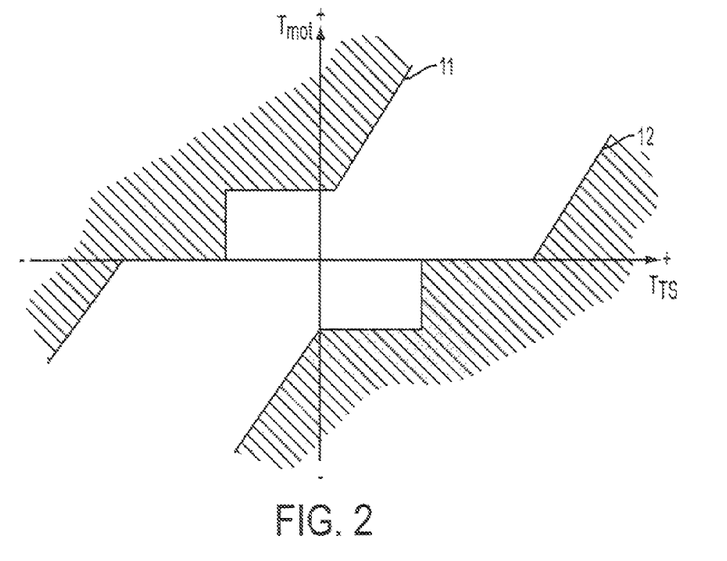
FIG. 2: range of values for the engine torque as a function of the torque sensor signal for the steering according to the invention.

FIG. 2 indicates in a system of coordinates, in the horizontal, possible values for a torque signal $T_{TS}$, which is indicated by the torque sensor 5 as a function of the torque introduced into the steering wheel 9. In the vertical axis a possible engine torque $T_{MOT}$ is shown, which is requested from the motor driver on the basis of the torque signal $T_{TS}$. An upper characteristic curve 11 and a lower characteristic curve 12 provide upper and lower threshold values to the signal $T_{MOT}$. The hatched areas above the characteristic curve 11 and below the characteristic curve 12 are prohibited areas, which the engine torque $T_{MOT}$ should not reach. From the characteristic curve 11 the respective maximum value max is determined accordingly, which must be delivered for the value delivered to the motor controller for the torque requirement signal $T_{RA}$. From the characteristic curve 12 the respective minimum value min is determined accordingly, which must be delivered for the value delivered to the motor controller for the torque requirement signal $T_{RA}$. The area between the characteristic curves 11 and 12 is the permitted value range in which the motor signal $T_{MOT}$ should be located. For a given torque signal $T_{TS}$ the motor signal $T_{MOT}$ can take various values. These values can be dependent upon the vehicle speed V.

Figure 3:
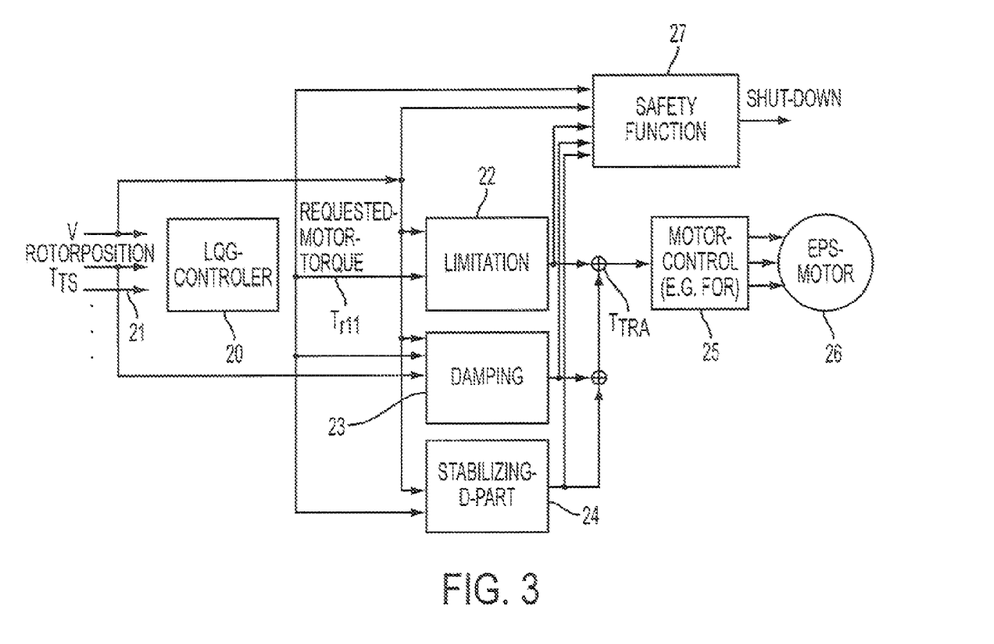
FIG. 3: a block diagram of the electric power steering.

FIG. 3 is a block diagram of a power steering according to the invention. In the block diagram the vehicle speed V and the signal $T_{TS}$ from the torque sensor 5 provide the input signals which are introduced into a controller 20. Further input signals can be introduced at 21. From the input values the controller 20 calculates a signal for the required engine torque $T_{RM}$. The torque signal $T_{TS}$ is fully available to the controller and can therefore be evaluated totally. The controller 20 likewise generates a signal $T_{RM}$, which comprises the complete possible range of values and thus has a maximum possible dynamic scope.

A limiting element 22 receives as an input signal the vehicle speed $V_O$ and the required engine torque $T_{RM}$. The limiting element 22 calculates from this, using a table or based on analytical functions, a maximum value and a minimum value, which the engine torque must take for the preset parameter values. In relation to FIG. 2, the limiting element 22 ensures that the required torque value does not enter the prohibited hatched areas of the diagram from FIG. 2.

Figure 7:
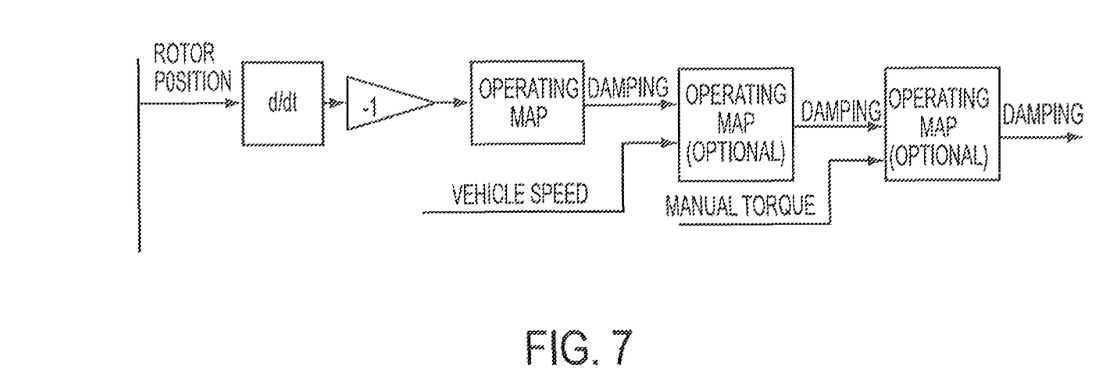
FIG. 7: a more detailed representation of the damping from FIGS. 3 and 5.
Figure 8:
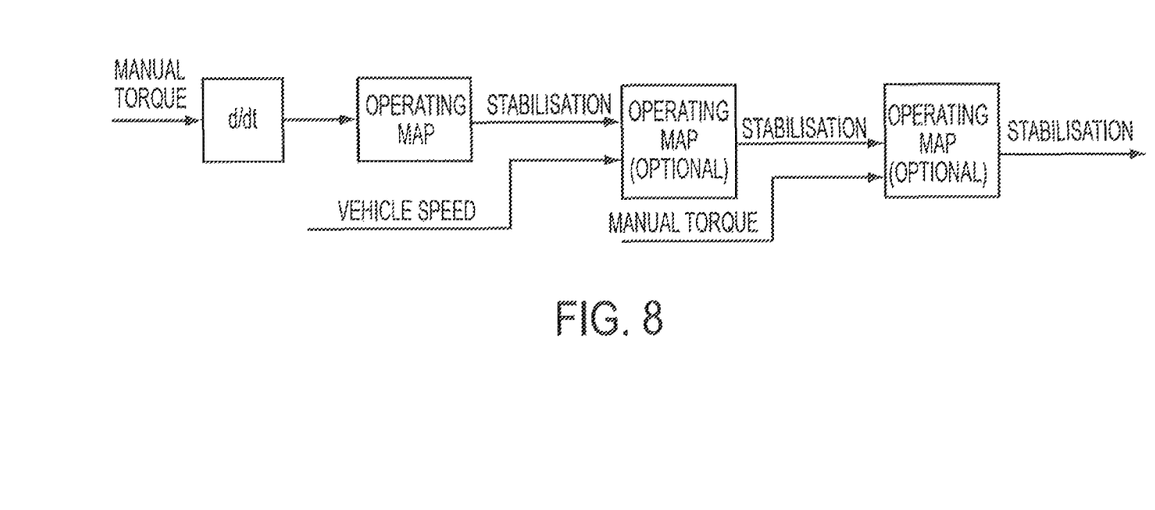
FIG. 8: a more detailed representation of the stabilisation from FIGS. 3 and 5.

The signal limited in this way by the limiting element 22 is added to further signals, described in more detail in relation to FIGS. 7 and 8, of a damping element 23 and a stabilisation element 24. The functions of the damping element 23 and the stabilisation element 24 (the latter is also known as the "D term") are known from electronically regulated electric power steering systems. The addition then provides a requirement signal $T_{RA}$ for the actual steering assistance torque required. Only the sum from the signals of the elements 22, 23 and 24 has the desired stability. The signal $T_{RA}$ is delivered to a motor controller 25 which finally impinges upon a servomotor 26 with current.

The signals generated are also passed to a safety function 27, which can bring about a shutdown of the power assisted steering if a redundant calculation of the elements 22, 23 and 24 identifies an error in the control unit. Here it is provided that the safety function 27 does not redundantly perform the complex calculation process of the controller 20, but only the recalculation of the elements 22, 23 and 24.

In order to achieve the target broad dynamic range of the power assisted steering it is important here that the signal $T_{TS}$ and the output signal of the motor controller 25 can cover the full available dynamic range, so that the full bandwidth of the signal $T_{TS}$ picked up by the torque sensor can be evaluated. Apart from this, the motor controller, the output value range of which is not limited, can call upon the maximum possible steering assistance performance of the servomotor 26. The limitation as a function of speed or of other parameters of the required power assistance torque $T_{RA}$ takes place in the limitation element 22.

Figure 4:
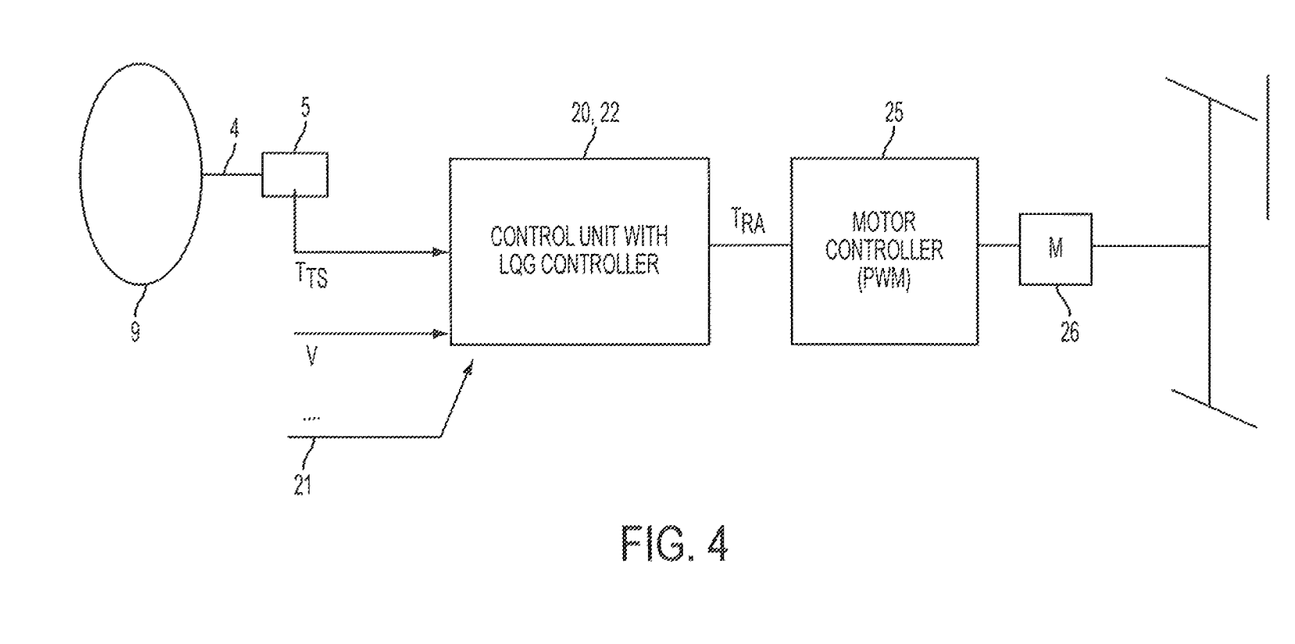
FIG. 4: a schematic representation of the steering system as a whole, with steering wheel, torque sensor, control unit, motor driver, motor and steering gear with the steered wheels.

FIG. 4 shows the controlled system of the power steering according to the invention in schematic view.

The handwheel 9 is connected by means of the spindle 4 with the torque sensor 5. The torque signal $T_{TS}$ enters the unit shown here as an integrated module, which comprises the controller 20 and the limiting element 22. Furthermore, the vehicle speed V is supplied to the unit 20, 22. Further signals 21, as described above, are taken into account by the control system.

As a function of the input variables the unit 20, 22 provides the torque requirement signal $T_{RA}$ to the motor controller or motor driver 25 which in turn impinges upon the servomotor 26 with current. Via a gear the servomotor 26 drives the steering rack and thus the steered wheels of the vehicle. The road has a reaction via the steered wheels on the steering shaft 4. In the torque sensor 5 therefore not only do torque signals occur based on an operation of the steering wheel 9, but also based on the reaction of the road via the wheels on the steering shaft 4. In particular torques can also occur at the torque sensor 5 if the steering wheel 9 is not operated or even if the driver lets go of it.

In a particularly advantageous further development the control takes place with an LQG control algorithm, as described in the lecture entitled "Optimale Regelung einer elektromechanischen Servolenkung" (*Optimum Control of Electromechanically Assisted Steering*) given to the 5th VDI Mechatronik Conference 2003 in Fulda (7-8 May 2003) by Hermann Henrichfreise, Jürgen Jusseit and Harwin Niessen.

Figure 5:
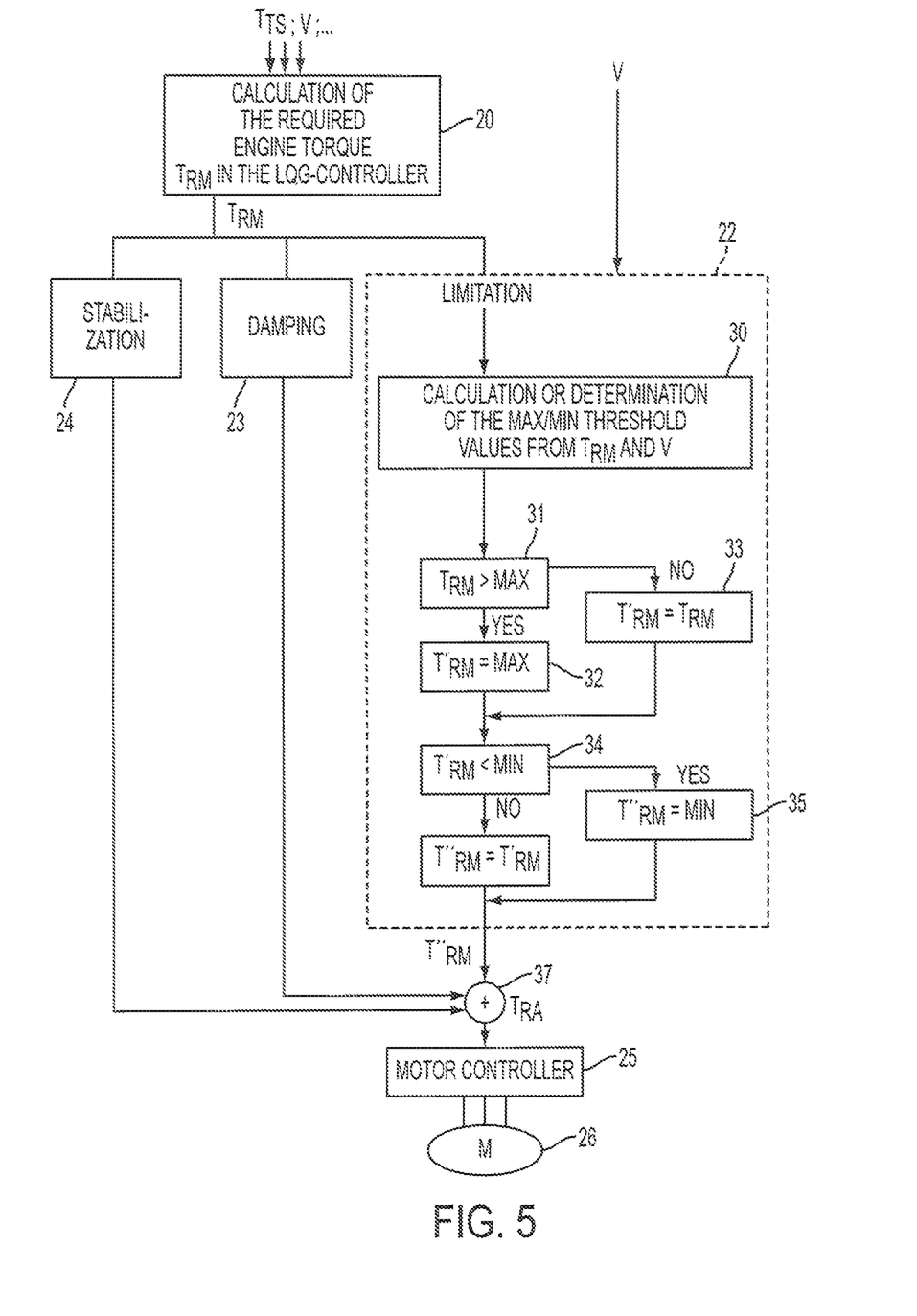
FIG. 5: the programme sequence of the control of the electric power steering in the form of a flow diagram.
Figure 6:
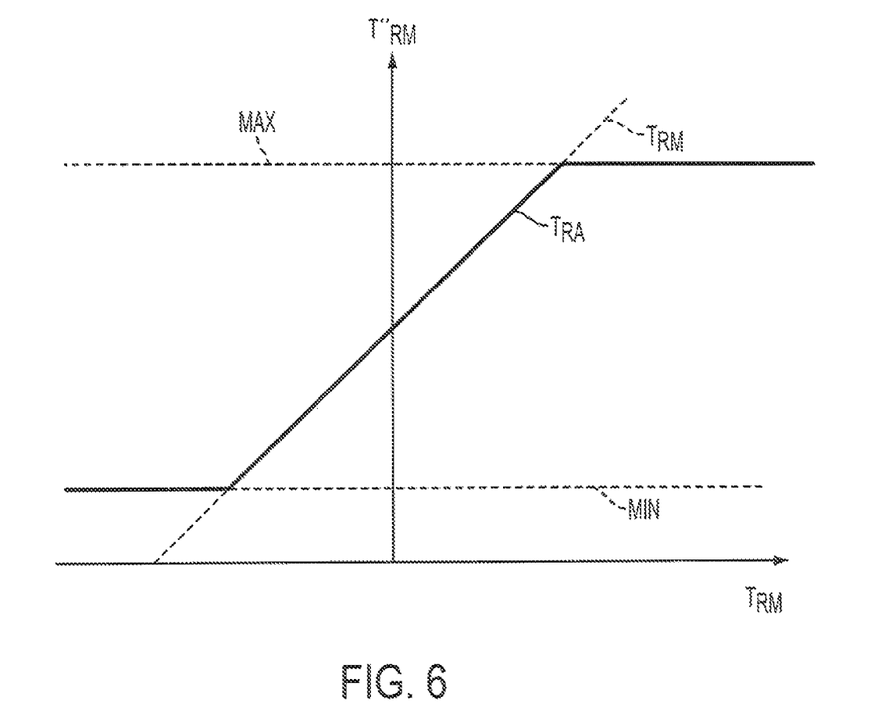
FIG. 6: the permitted range of values of the torque requirement signal $T_{RA}$ as a function of the torque sensor signal $T_{TS}$.

FIG. 5 illustrates the process sequence in the power steering according to the invention, which is carried out in order to calculate the manual control of the servomotor 26.

The input signals $T_{TS}$ and V are evaluated in a controller and in prior art fashion a required engine torque is calculated from this which is output as the signal $T_{RM}$. The control unit 20 is known from the prior art. It can for example work according to the principle of the control unit that is described in European patent specification EP 1 373 051 B1. This control unit works as a so-called monitor, which from input variables calculates various output variables and internally used data. In the known control unit, which can correspond to the control unit 20, a mathematical model of the steering is stored, which contains the various dependencies between the measured values and the non-measured state values. It can, however, be provided that the control unit 20 takes the form of a relatively simple control unit in the form of a PID controller or similar.

The engine torque signal $T_{RM}$ is then passed to the already mentioned components, namely the damping part 23 and the stabilisation part 24. In parallel the limiting element 22 also receives this signal.

The further input signal, the vehicle speed V, similarly goes to the limiting element 22 which is shown here as a broken line.

In the limiting element 22 in a calculation step 30 from a table or using analytical functions the permitted threshold values (max upper threshold value and min lower threshold value) of the engine torque requirement signal $T_{RM}$ are now calculated. The actual signal $T_{RM}$ delivered by the control unit 20 is then compared in a first step 31 with the upper threshold value max. If $T_{RM}$ is greater than max, then $T'_{RM}$=max is set. If $T_{RM}$ is smaller than the threshold value max, then $T'_{RM}=T_{RM}$ remains unchanged. This is illustrated in calculation steps 32 and 33. The signal with this upper threshold value is delivered to step 34, in which the signal $T'_{RM}$ is compared with the lower threshold value. If $T'_{RM}$ is smaller than the lower threshold value min, then $T''_{RM}$ is replaced by min. This takes place in step 35.

If it is found in step 34 that $T'_{RM}$ is not smaller than min, then $T''_{RM}=T'_{RM}$ is output to adder 37.

As the output signal of the limiting element 22 therefore a signal is generated which represents the unchanged signal $T''_{RM}=T_{RM}$ if in particular in steps 31 and 34 it is found that $T_{RM}$ is smaller than max and greater than min. If in steps 31 or 34 the threshold values are exceeded upwards or downwards, then the respective threshold value is delivered as an output of the limiting element 22.

This output signal is delivered to an adder 37, which also contains the output values of the damping element 23 and the stabilisation element 24. The latter can have positive or negative signs and are added in the adder 37 to make a torque requirement signal $T_{RA}$. The signal $T_{RA}$ is then delivered to the motor controller 25, which energises the servomotor 26 accordingly.

It should be stressed that the output signal $T''_{RM}=T_{RM}$ of the control unit 20 remains unchanged by the limiting element 22, provided that the threshold values max and min calculated in step 30 are not exceeded. Thus for the signal path $T_{TS}$ to $T_{RA}$ the entire possible dynamics are available.

The limitation that takes place in steps 33 and 35, evaluates the full information range of the torque sensor $T_{TS}$ and the other input data of the control unit 20. In the case of limitation also the torque requirement signal $T_{RA}$ delivered to the motor controller 25, as a result of the added damping-stabilisation components, can be greater than or smaller than the upper limits max and min from the limitation element 22, so that the motor controller 25 and accordingly the servomotor 26 can develop a higher level of dynamics than could be envisaged simply on the basis of the limiting element 22.

FIG. 7 shows a block diagram of the damping element 23. It illustrates how the damping substantially evaluates the temporal derivation of the rotor position of the servomotor 26 and generates a damping signal from this. The vehicle speed and the manual torque come into play as further parameters.

FIG. 8 shows a block diagram of the stabilisation element 24. Here it is illustrated how the stabilisation element substantially evaluates the temporal derivation of the manual torque and generates a stabilisation signal from this. Here also the vehicle speed and the manual torque come into play as further parameters.

KEY

1. Steering gear
2. Track rod
3. Bellows
4. Steering shaft
5. Torque sensor
6. Motor housing
7. Gear housing
8. Control system
9. Steering wheel
11. Upper characteristic curve
12. Lower characteristic curve
20. Controller
21. Signal
22. Limiting element
23. Damping element
24. Stabilisation element
25. Motor controller
26. Servomotor
27. Safety function
30. Calculation step
31. Calculation step
32. Calculation step
33. Calculation step
34. Calculation step
35. Calculation step

The invention claimed is:

1. A control method for a steering system with electric power assistance, the steering system including
   a steering wheel, controllable by a driver,
   an electric power assist motor,
   an electric control unit, which includes a memory for storing digital data,
   a motor controller that, based on a target engine torque sent to the motor controller, determines and sends out electrical signals for controlling the electric power assist motor,
   at least one sensor device for determining a control variable introduced into the steering wheel,
   a damping element for generating a damping signal, and
   a stabilisation element for generating a stabilisation signal, and the method comprising:
   determining in the control unit, with the help of the control variable, a preset value for an engine torque of the electric power assist motor;
   using an upper threshold value for target engine torque stored in a limiting element;
   for a case A, in which the preset value exceeds the upper threshold value, delivering, by the limiting element, the upper threshold value as the target engine torque to the motor controller;
   for a case B, in which the preset value does not exceed the upper threshold value, delivering, by the limiting element, the preset value as the target engine torque to the motor controller;
   a safety function performing a redundant calculation of the output signals of the limiting element, of the damping element and of the stabilisation element; and
   summing output signals of the limiting element, the damping element and the stabilisation element, and outputting a result of said summing to the motor controller as the target engine torque.

2. The control method according to claim 1, further comprising:
   using a lower threshold value stored in the limiting element, wherein the lower threshold value has a lower than the upper threshold value
   for a case C, in which the preset value falls below the lower threshold value, outputting from the limiting element the lower threshold value as the target engine torque to the motor controller, and
   for a case D, in which the preset value does not fall below the lower threshold value and does not exceed the upper threshold value, outputting from the limiting element the preset value as the target engine torque to the motor controller.

3. The control method according to claim 1, wherein the upper threshold value is dependent upon the control variable.

4. The control method according to claim 1, wherein the upper threshold value is dependent upon vehicle speed.

5. The control method according to claim 1, wherein the safety function does not perform all calculation processes of the controller redundantly.

6. The control method according to claim 2, wherein the lower threshold value is dependent upon the control variable.

7. The control method according to claim 2, wherein the lower threshold value is dependent upon vehicle speed.

* * * * *

UNITED STATES PATENT AND TRADEMARK OFFICE
CERTIFICATE OF CORRECTION

PATENT NO.         : 8,630,771 B2                                        Page 1 of 1
APPLICATION NO.    : 13/499593
DATED              : January 14, 2014
INVENTOR(S)        : Bernd Sternecker et al.

It is certified that error appears in the above-identified patent and that said Letters Patent is hereby corrected as shown below:

On the Title Page:

At (73) the Assignee should be corrected, to read --ThyssenKrupp Presta AG, Eschen (LI) and Bayerische Motoren Werke AG, Munchen, (DE)--

Signed and Sealed this
Twenty-fourth Day of June, 2014

Michelle K. Lee
*Deputy Director of the United States Patent and Trademark Office*